(12) United States Patent
Cheung

(10) Patent No.: US 8,331,608 B2
(45) Date of Patent: Dec. 11, 2012

(54) HIDDEN IMAGE IDENTIFICATION SYSTEM, PRODUCTS, IDENTIFICATION DEVICE AND PRODUCING METHOD

(75) Inventor: Wah Sing Alex Cheung, Guangdong (CN)

(73) Assignee: Digigraphics Toys & Games Ltd., Chai Wan (HK)

( * ) Notice: Subject to any disclaimer, the term of this patent is extended or adjusted under 35 U.S.C. 154(b) by 1005 days.

(21) Appl. No.: 12/309,327

(22) PCT Filed: Jul. 12, 2007

(86) PCT No.: PCT/CN2007/002141
§ 371 (c)(1),
(2), (4) Date: Jan. 12, 2009

(87) PCT Pub. No.: WO2008/009222
PCT Pub. Date: Jan. 24, 2008

(65) Prior Publication Data
US 2009/0324104 A1    Dec. 31, 2009

(30) Foreign Application Priority Data

Jul. 12, 2006 (CN) .......................... 2006 1 0101587

(51) Int. Cl.
*G06K 9/00* (2006.01)
(52) U.S. Cl. ........ 382/100; 382/111; 382/112; 382/113; 380/54; 380/51; 380/55; 359/619; 359/621; 359/626
(58) Field of Classification Search .................. None
See application file for complete search history.

(56) References Cited

U.S. PATENT DOCUMENTS

| | | | |
|---|---|---|---|
| 5,695,346 A * | 12/1997 | Sekiguchi et al. | 434/365 |
| 5,995,638 A * | 11/1999 | Amidror et al. | 382/100 |
| 7,337,957 B2 * | 3/2008 | Ashizaki et al. | 235/382 |
| 7,487,915 B2 * | 2/2009 | Alasia et al. | 235/454 |
| 2007/0030892 A1* | 2/2007 | Winkelhorn | 375/240.01 |
| 2007/0057061 A1* | 3/2007 | Alasia et al. | 235/454 |
| 2007/0085898 A1* | 4/2007 | Zaitsevsky | 347/251 |
| 2007/0229263 A1* | 10/2007 | Staub et al. | 340/572.1 |
| 2008/0240512 A1* | 10/2008 | Nireki | 382/112 |

FOREIGN PATENT DOCUMENTS

WO    WO 2005106601 A2 *  11/2005

\* cited by examiner

*Primary Examiner* — Matthew Bella
*Assistant Examiner* — Jason Heidemann
(74) *Attorney, Agent, or Firm* — Raymond Y. Chan; David and Raymond Patent Firm

(57) ABSTRACT

The invention is concerned with a hidden image product, an identification device which shows the hidden image information, an identification system, the produce method of the produce and the identification equipment, the identification equipment contains a single layer or multi-layer lens with the specified array micro-structure. The produce contains the array pixels with same-level array-distance corresponding with the identification equipment array micro-structure. The selected area of the array pixels and the identification equipment array micro-structure has the entirely or partly controlling phase excursion, shows the micro-structure or the hidden image in the pixel when the array of pixels of the product or the array of the identification equipment array micro-structure is superposition or spacedly squaring with distance. The invention overcomes the low anti-false precision and the inconvenience of the existing hidden image identification technique.

1 Claim, 10 Drawing Sheets

HIDDEN IMAGE IDENTIFICATION SYSTEM, PRODUCTS, IDENTIFICATION DEVICE AND PRODUCING METHOD

BACKGROUND OF THE PRESENT INVENTION

1. Field of Invention

The present invention relates to the field of optics to precede the hidden image product and its recognition, and more particularly to a hidden image identification system and the producing method thereof for providing a hidden image information of a product.

2. Description of Related Arts

In the existing identification technology, the overwhelming major method utilizes the other products (the third supplies) to distinguish the identity of the products, such as mark sticker, radiation frequency mark (RFID), barcode, code, telecom code technology, packaging of products, database, special craft, supplies, color, sizes, name, and type. These marks can be identified by observation through the eye of a user, so that the marks can be easily copied. In other words, the anti-falsification of these marks is bad. On the other hand, some of the marks may need the special-purpose or expensive testing tools to identify them, so the identification process is inconvenient, high costs, and difficult to popularize.

A good recognition and anti-falsification technology needs to meet the following condition: The technology has low processing costs, low measuring costs, precise testing messages, difficult to copy, no influence the appearance and production procedure, able to cooperate the procedure of processing, convenient to measure, traceability, uniqueness, anti-falsification function, products' compatibility, management ability, self-technology protecting, and so on.

In order to accomplish the above function, the technology is the most important matter. The technology can't depend on new supplies, tedious processing procedure or craft. It should avoid the complicated and expensive electronic detecting instrument. It should adopt a kind of technology that can join in the process of production, and does not need other processing. The most ideal method is to depend on the essential and superficial lamination structure of the supplies or printing site structure to distinguish, and which is equal with biological fingerprint, pupil, etc.

The existing hidden image recognition technologies all have the insufficient precision problems and cannot use the naked eyes to distinguish. They can be tested with specific recognizer, the lens, and the grating materials which can buy on the market. The testing images are ambiguous, like the secret mark. Further, the structure of the image is single, and the accurate of density is usually only at 200 line/inch or 80 line/centimeter. This technology cannot satisfy with the recognition and safe requirement of anti-falsification.

Furthermore, the existing hidden image technology usually takes advantage of the features of the optical grating because the hidden image is composed by a plurality of dots. Therefore, the hidden image can only be printed on a printing paper, and is hardly use on the product directly. Otherwise, the hidden image being directly printed on the product may damage the appearance to the product. The existing optical grating is only focus on the application of the 3-dimensional optical grating, but neglecting the importance of anti-falsification and safe identification. Its highest level of optical grating can only below 159 lines per inch or 63 lines per centimeter. Therefore, the format is too easy for the imitator to copy the product. Finally, it is obviously can't achieve the requirement of the recognition and safe requirement of anti-falsification.

SUMMARY OF THE PRESENT INVENTION

A main object of the present invention is to provide a hidden image identification technology to overcome the low anti-false precision and the inconvenient of the existing hidden image identification technique. The hidden image product comprises identification equipment which shows the hidden image information, an identification system, the producing method of the produce and the identification equipment.

In order to accomplish the above objects, the present invention provides a hidden image identification system which comprises an identification device for a product, wherein the identification device comprises a single layer or a multi-layer (polymorphous) lens having a specified array of a micro-structure, an array of pixels with same-level of array-distance corresponding to the micro-structure, wherein the selected areas of the array of pixels and the micro-structure of the identification device are entirely or partially phase shifted in a controllable manner, such that when the array of pixels and the array of the micro-structure of the identification device are superpositioned or spacedly aligned with a predetermined distance, the hidden image of the array of pixels or the micro-structure of the identification device is shown. The present invention overcomes the low anti-false precision and the inconvenience of the existing hidden image identification technique.

The product comprises die (mold), die product (mold product) or non-die product (non-mold product), product that can be printed or sent an electronic-video image of the photoelectric display device. The array of pixels is located on the surface of the die, die product or non-die product, or printed product, or embedded with the electronic-video image.

The phase shift includes two-dimensional or three-dimensional location, size, depth, or color change. Once the array of pixels is phase shifted, the hidden image is hidden on the product. Likewise, once the micro-structure is phase shifted, the hidden image is hidden on the identification device. Or, when both of the array of pixels and the micro-structure are correspondingly phase shifted, the hidden image will be hidden on both of the product and the identification device.

The above mentioned identification device can be an automatic recognition device that the hidden image can be obtained by the lens through the sensor instrument, wherein the feature of the hidden image is extracted and analyzed for automatically recognition of the hidden image.

The above mentioned micro-structure of the identification device can be constructed by different layers, different angles, different segments, different arrays, or the combination thereof. By overlapping the different hidden images with each other, the hidden images are formed at the same location on the product. Accordingly, the hidden image can be an animation image or a three dimensional image.

The precision and the roughness of the lens surface of the above mentioned identification device is configured to have the nano-level. Correspondingly, the precision of the array of pixel of the product is also configured to have the nano-level.

The identification device can be a part of the structure of the product for self-testing or as a special effect for display.

Corresponding to the hidden image for the product, the product comprises the array of pixel with the same level of array-distance in responsive to the single layer or multi-layer lens of the micro-structure of the identification device for showing the hidden image. The selected areas of the array of pixels and the micro-structure of the identification device are entirely or partially phase shifted in a controllable manner, such that when the array of pixels and the micro-structure of the identification device are superpositioned or spacedly aligned at a predetermined distance, the hidden image of the array of pixels or the array of the micro-structure of the identification device is shown.

The product comprises die, die product or non-die product, product that can be printed or sent an electronic-video image of the photoelectric display device. The array of pixels is located on the surface of the die, die product or non-die product, or printed product, or embedded with the electronic-video image.

The precision of the array of pixels is ranked at nano-level.

Corresponding to the hidden image for the identification device, the identification device comprises the single layer or multi-layer lens having the micro-structure with the same level of array-distance in responsive to the array of pixel of the product. The selected areas of the array of pixels and the micro-structure of the identification device are entirely or partially phase shifted in a controllable manner, such that when the array of pixels and the micro-structure of the identification device are superpositioned or spacedly aligned at a predetermined distance, the hidden image of the array of pixels or the array of the micro-structure of the identification device is shown.

The lens of the identification device can be a plastic injection lens, flow lens, pressured mold lens, corrosion lens, photoengraving lens, laser lens, film coated lens, liquid crystal lens, or film lens.

The material of the above mentioned identification device can be plastic, crystal, transparent glass, translucent glass, or translucent with colored glass.

According to the above mentioned lens of the identification device, wherein the micro-structure of the lens surface of the lens can be a convex lens, concave lens, flat lens, prisms, V-groove lens, grating lens, or the combination thereof.

When the convex lens is used as the lens of the micro-structure of the identification device, the radius value of the micro-structure is:

$$r = f \div (2 \times Mf \times Sf \times If), \text{ wherein:}$$

f: the setting distance between the surface of the convex lens and the surface of the product;

Mf: the refraction coefficient of the medium of lens;

Sf: the proportion of the surface of the product to the density of array pixels;

If: the release of the contraction rate of the procedure of making the lens.

The precision and the roughness of the lens surface of the above mentioned identification device is graded to have the nano-level.

The above mentioned identification device can be an automatic recognition device that the hidden image can be obtained by the lens through the sensor instrument, wherein the feature of the hidden image is extracted and analyzed for automatically recognition of the hidden image.

Accordingly, the method of producing the hidden image for the product comprises the following steps.

(1) Set the array of pixels for the product, wherein the array of pixels has the same level of array-distance corresponding to the single layer or multi-layer lens of the micro-structure of the identification device.

(2) Set the content of the hidden image and the position of the array of pixels.

(3) Phase shift dot matrix of the array of pixels in the selected area of the hidden image.

(4) Apply the array of pixels on the product.

The method of producing the hidden image for the identification device comprises the following steps.

(1) Set the micro-structure of the single layer or multi-layer lens that the micro-structure has the same level of array-distance corresponding to the array of pixels of the product.

(2) Phase shift the micro-structure of the lens in responsive to the need of the selected area of the pre-hidden image.

(3) Process the micro-structure on the lens of the identification device.

Accordingly, the present invention has the following advantages. The present invention can be processed through the accurate numeral plenty axles free optics curved surface equipment (Freeform Machining) and can cooperate with single-point diamond process technologies to practice optics mode or the symmetrical and asymmetrical micro-structure of the script, and then process to form the nano-level of optics lens. This processing mode is to handle the same micro-structure through computer, and then identify the hidden corresponding image area as numeral phase tiny handling method, and further using this method in the products mode, printing plate, or electronic signal video image. The products pass the corresponding optics lens under the overlapping measurement, and then form a space visual frequency between products and lens, and therefore generate "Moiré" effect. Its precision is extremely high and has the luster effect, so we can see the extremely rich 3-D effect of the pictures, and it is convenient and swift to distinguish true or false under the abominable environment. In addition, the extremely accurate 3-D optics structure is difficult to model. This invention can be avoided to increase extra machinery, figure, chemical process procedure, expensive testing equipment, space, influence of its appearance, and can be applied to most supplies, and further is enabled to produce a kind of distinguishing signals or marks or products. This signal and marks can not be distinguished through naked eye, and must use the good optics lens for testing during the procedure.

The present invention can be applied to all model products, various kinds of printing products and electronic video image signal. In the supplies, it includes plastic, metal, pottery, glass, paper, non-liquid products, etc. There are material and products of regular shape in the nature. In processing, this invention can be plastics, printing, hot pressing, drawing, corroding, laser processing, electroplating, and the numerical control equipment, etc. The electronic video signal includes digital electronic picture. When operating technique system, it should consider various supplies' processing mode, processing position and the interaction in precision of technological content, and then can effectively develop the advantage of the present invention.

The invention adopts nano-level of optics lens cooperate with manufacturing technology to appear and hide the picture, and it particularly have the following advantage comparing with the relevantly hidden distinguishing technology:

1. The inspection cost is low, and does not need special instrument to test and measure. Further, it does not need electronic or the lighting equipment to test, so it is conveniently and swiftly.

2. The information getting from the inspection is accurate and there is no specious grey area.

3. There is no-influence of the appearance of products, so it can accomplish very meticulous processing on the surface. The hidden image cannot be observed by naked eye. The hidden image with the information can be formed on a smooth and flat surface of the product.

4. It is very difficult to copy, because the content of the hidden image is hidden which needs to cooperating the appointing optics lens to explain, and lens pitch into the arranging picture structure of lens, wherein the hidden image can be constructed with different levels, different angles, different densities, and different depths of omni-directional to form the combination thereof. The probability of duplicating and breaking will reduce greatly. This kinds of multi-layers, multi-faces, multi-times, and multiple angles of omni-directional segment encrypt mode is easy to encrypt the data, and are unable to compare the digital encryptions and technology.

5. The scan dynamics quality is high, the product and the surface of printing product have micro-structure or dot matrix, wherein the existing top-graded scanner and 3-D mechanic cannot read the nano-leveled data of the hidden image.

6. The compatibility of the present invention is extremely high. So long as the product making through the procedure, such as mold, edition make, printing, corroding, electroplating or figure process, this invention can all be used.

7. The present invention can cooperate with auto-sensor recognition system to obtain the information of the hidden image, and then connect to the database to obtain more product information for testing record and management.

8. The present invention can be used to classify and divide the anti-falsification, testing, false, stream, and safety management. Because of it's the cooperating optical arraying structure, the hidden image can easy to show the movement, 3-D, and colorful effect.

9. The micro-lens in the present invention includes curved and convex lens, and these lens can effectively control the focal length between lens and the testing product, so the benefit can achieve all the observing distance testing and can inspect the hidden image on the curved and deformed surface.

10. The present invention has the properties of limpid optics lens, and can conveniently practice the testing under the weak and dark light. Further, these lenses can incorporate with some special light, coating, printing ink, polarized light technology, so they can enhance the testing ability of lens to the higher level.

11. The present invention can improve the ability of producing management, and anti-falsification, so producing company can add hidden marks in process, and only need to buy anti-falsification marks from outside, and then produce and manage easily.

12. The present invention can apply for any product for testing purpose, and also can use in electronic visual pictures and intellectual property protection.

These and other objectives, features, and advantages of the present invention will become apparent from the following detailed description, the accompanying drawings, and the appended claims.

BRIEF DESCRIPTION OF THE DRAWINGS

FIG. 13 is a diagram of the present invention illustrating the setting of the texture and graphic of the lens and corresponding grid array, wherein FIG. 13a is an enlarged view of the grid array to show the texture and graphic of the lens (the white dotted lines at the grid array showing the original position of the dot matrix, which is equivalent to the main axis position of the micro-structure of the convex lens).

FIG. 14 is a diagram of the present invention illustrating the phase shift of the selected area of the hidden image, wherein FIG. 14a is an enlarged diagram thereof.

FIG. 15 is a diagram of the present invention illustrating the result graphic after the implementation, wherein FIG. 15a is an enlarged diagram thereof to show the hidden image in FIG. 12.

DETAILED DESCRIPTION OF THE PREFERRED EMBODIMENT

Figure 1:
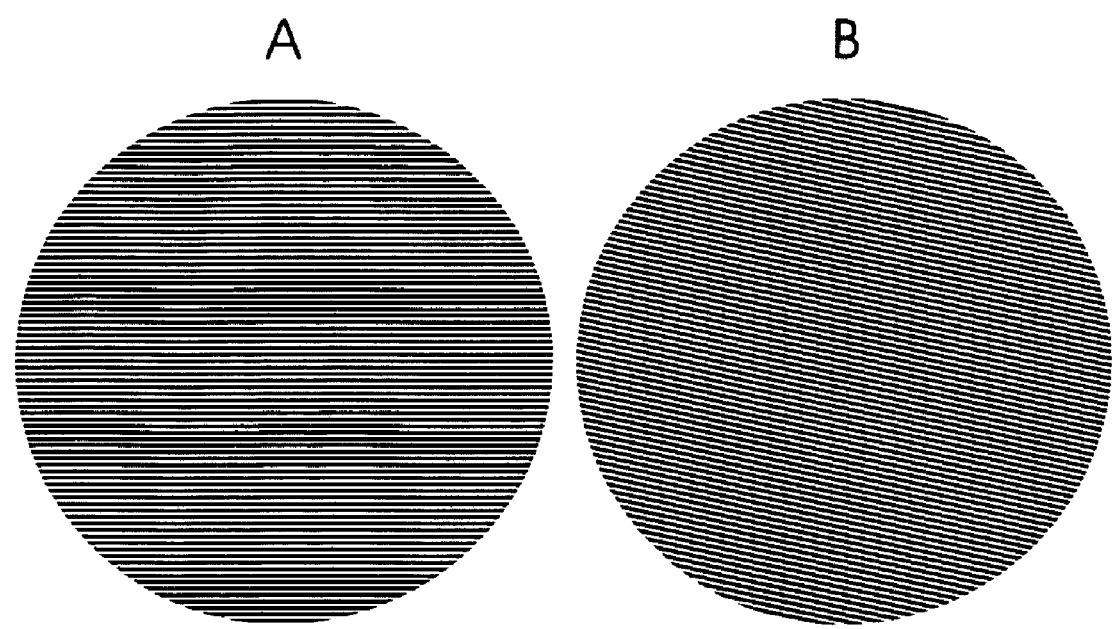
FIG. 1 is a diagram of the present invention illustrating two equal or two similar frequency cycle image, wherein A represents the surface of the product and B which is corresponding to A and represents the general grating lens.

The application of the invention is mainly to overlap two equal or similar frequency cycle images (optics lens has one frequency, and product has similar frequency). Therefore, it will result in the third frequency image to achieve the goal of hidden the image. The effect of phase shift of hidden image between one and each of them is called Moore's effect. If the user is able to control the phase shift very well, the original set hidden image will be showed as the user set.

The present invention provides a hidden identification system comprising a produce and the identification device, wherein the identification device comprises a single layer or multi-layer lens with the specified array of micro-structure. The product contains the array of pixels with same level of array-distance corresponding to the micro-structure of the identification device. The selected areas of the array of pixels and the micro-structure of the identification device are entirely or partially phase shifted in a controllable manner, such that when the array of pixels and the micro-structure of the identification device are superpositioned or spacedly aligned at a predetermined distance, the hidden image of the array of pixels or the array of the micro-structure of the identification device is shown. The effect of phase shift of the hidden image is created by overlapping the two equal or similar frequency cycle images in responsive to Moore's effect, so as to create a third new frequency image.

The product comprises die, die product or non-die product, product that can be printed or sent an electronic-video image of the photoelectric display device. The array of pixels is located on the surface of the die, die product or non-die product, or printed product, or embedded with the electronic-video image.

The phase shift includes the changes of two-dimensional or three-dimensional of position, size, depth, or hue.

Once the array of pixels is phase shifted, the hidden image is hidden on the product. Likewise, once the micro-structure is phase shifted, the hidden image is hidden on the identification device. Or, when both of the array of pixels and the micro-structure are correspondingly phase shifted, the hidden image will be hidden on both of the product and the identification device.

The product of the present invention comprises the array of pixels with the same level of array-distance in responsive to the single layer or multi-layer lens of the micro-structure of the identification device for showing the hidden image. The selected areas of the array of pixels and the micro-structure of the identification device are entirely or partially phase shifted in a controllable manner, such that when the array of pixels and the micro-structure of the identification device are superpositioned or spacedly aligned at a predetermined distance, the hidden image by the phase shift of the array of pixels is shown. The precision of the array of pixels is graded at nano-level.

The identification device of the present invention comprises the single layer or multi-layer lens having the micro-structure with the same level of array-distance in responsive to the array of pixel of the product. The selected areas of the array of pixels and the micro-structure of the identification device are entirely or partially phase shifted in a controllable manner, such that when the array of pixels and the micro-structure of the identification device are superpositioned or spacedly aligned at a predetermined distance, the hidden image of the array of pixels or the array of the micro-structure of the identification device is shown.

The precision and the roughness of the lens surface of the above mentioned identification device is configured to have the nano-level, such that the light transmissibility of the lens is extremely high and the lens surface is flat and even. The tools for making the lens and the mold have the same precision standard to ensure the error during the identification process. By processing the same implementation, three-dimensional micro-structure, array-distance, density frequency of the lens to any product, the hidden image can be embedded into the lens mold or the product through the phase shift of the hidden image. Moreover, identification the product through the phase shift not only provides the way to hide the hidden image without changing the appearance of the product like a invisible mark, but also keeps the manufacture procedure without any alternation. Finally, it also improves the anti-falsification, testing, false, stream, and safety management. The hidden image or mark can change anytime according to management demand, and can manage by different managing levels. Imitation of these optical lenses and their dies is extremely difficult, so that the present invention can effectively protect the intellectual property and improve the product identification.

The nano-level (nanoscale) optical lens of the present invention is adapted to hide the hidden image, wherein Because of its sophisticated optical three-dimensional structure, it can read the object with a distance for observation and measurement, and can be used in product with curved surface or with special-shaped surface. The micro-structure of the lens of the identification device can be constructed by different layers, different angles, different segments, different arrays, or the combination thereof. By overlapping the different hidden images with each other, the hidden images are formed at the same location on the product. Accordingly, the hidden image can be an animation image or a three dimensional image. The lens can incorporate with printed color layers or photoelectric display device to detect the color hidden image, wherein multiple hidden images, animations, three dimensional images or color images can be placed at one location of the printed product or mold product for the lens to read. These applications can be used for "hint and answer" of teaching material or educational books to reduce the consumption of paper, such that the present invention is an environmentally-friendly device and can reduce the cost of printing and logistics. Furthermore, it is easier for people to read and check the answer. It also can apply for the paper product of the game product. Through the game development and lens technology, and its various functions of the application, the present invention inspires the memory of the participants and enhances the interest and attraction of the game.

The nano-level optical lens and its manufacturing technology can be used for an automatic identification system that the hidden image can be obtained by the lens through the sensor instrument, wherein the feature of the hidden image is extracted and analyzed for automatically recognition of the hidden image with special marks, characters, graphics, or existing two dimensional codes, and for connecting to the database to obtain more product information for testing record and management.

The hidden images are correspondingly applied on the lens surface of the lens, on the product mold, or directly on the product to perfectly match with the hidden image. In other words, the hidden images are mutually formed to enhance the product identification and anti-falsification at the highest level. In addition, the identification device can also be part of the product for self-testing or as a special effect for display.

The following is the detail description of the embodiment and Figures.

Figure 2:
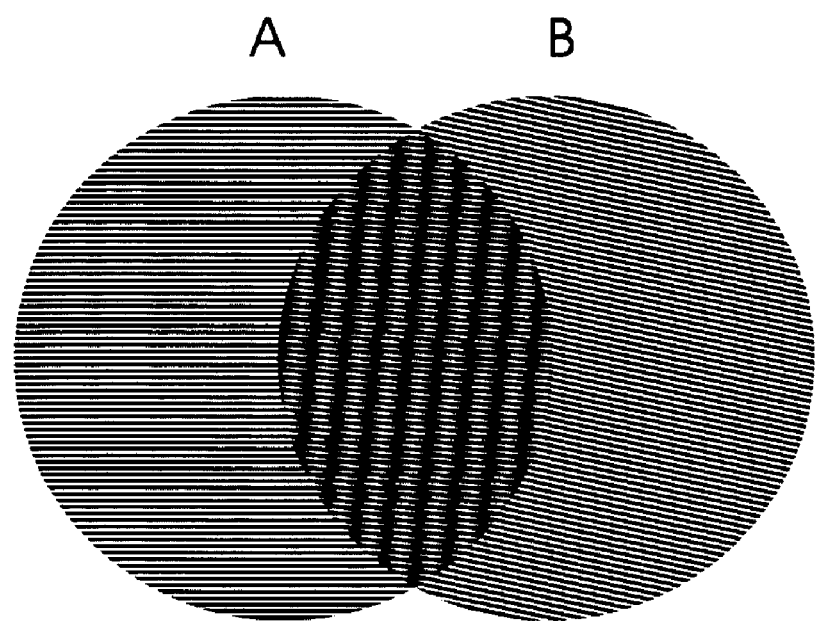
FIG. 2 is a diagram of the present invention illustrating two equal or two similar frequency image overlapped with each other to create a third frequency cycle image.
Figure 3:
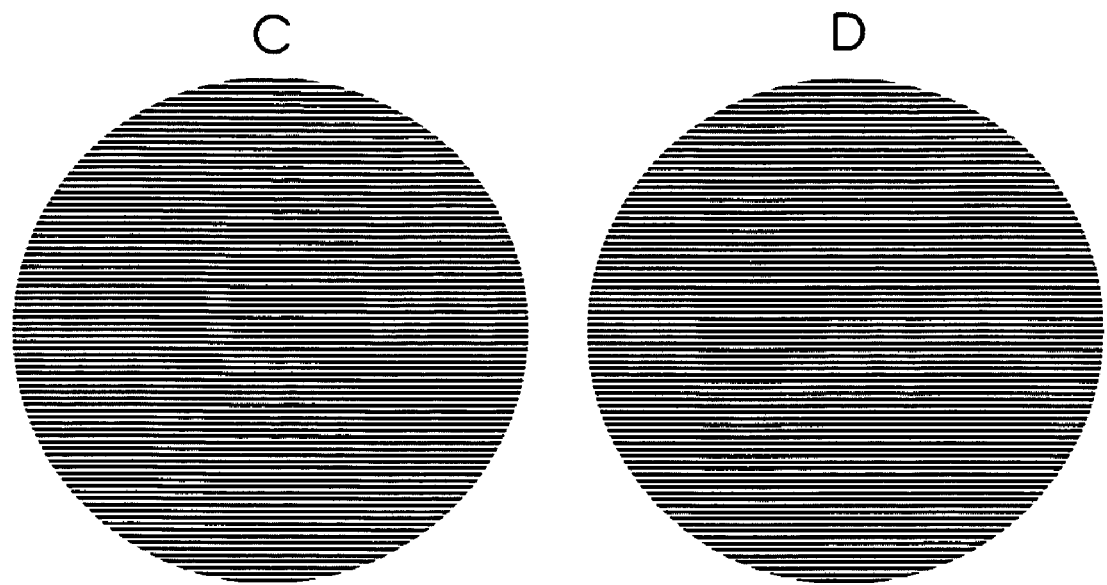
FIG. 3 is a diagram of the present invention illustrating two images with same pre-configured texture, wherein C represents the surface of the product and D represents the general grating lens.
Figure 4:
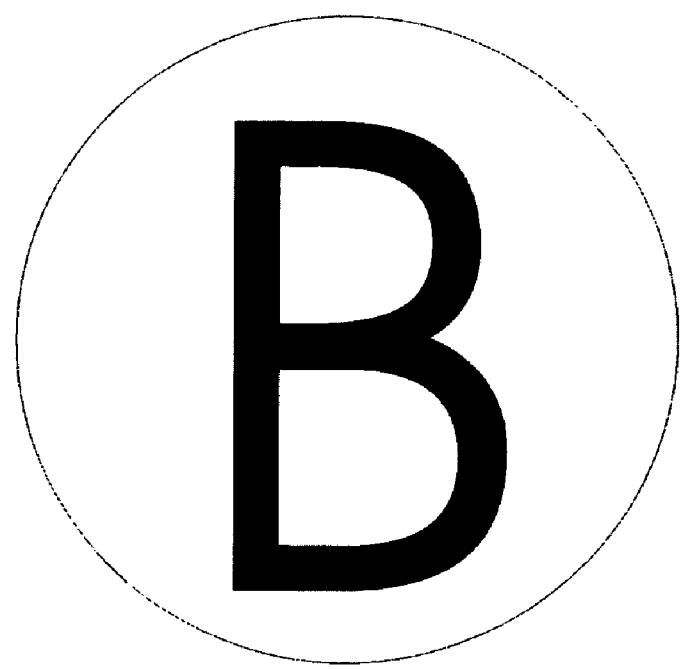
FIG. 4 is a diagram of the present invention illustrating the capital B as a hidden image.
Figure 5:
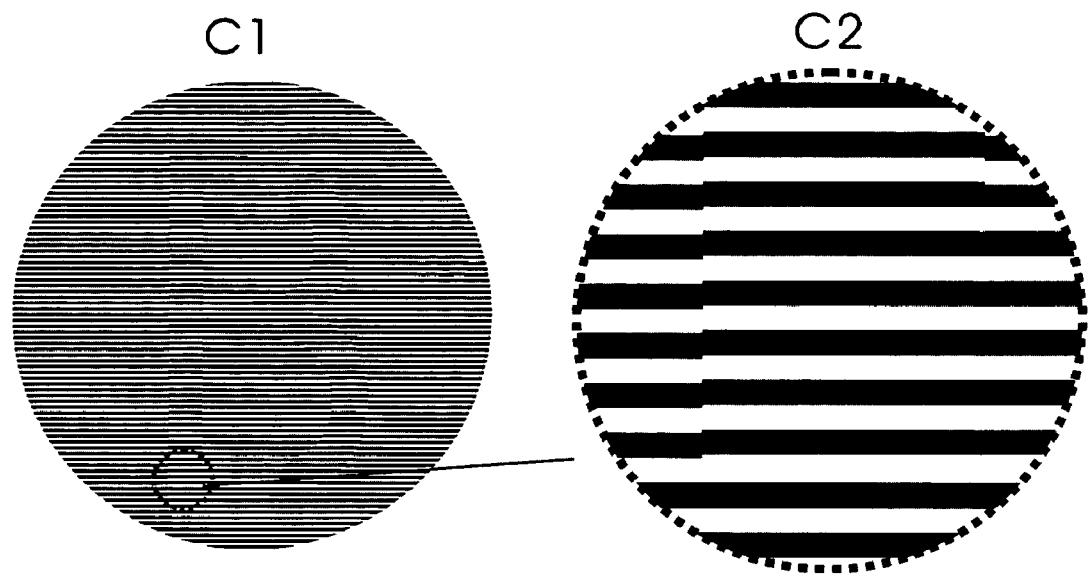
FIG. 5 is a diagram of the present invention illustrating the hidden image C1 shown by phase shift and C2 as a partially enlarged image of C1.
Figure 6:
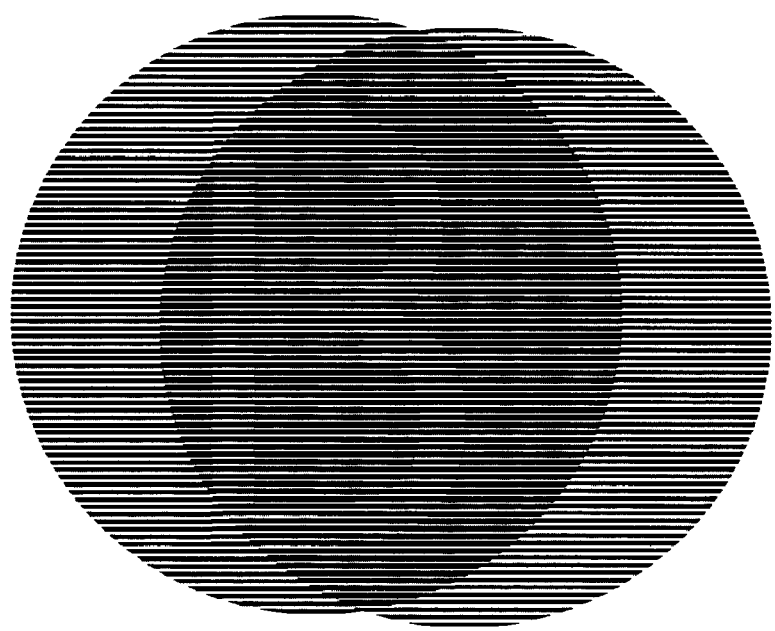
FIG. 6 is a diagram of the present invention illustrating the hidden image C1 shown in FIG. 5 by overlapping with the optical lens.

The present invention uses the nanoscale optical lens of the decoding system to read the hidden image for the detection and test of the product, printed product, or electronic video image, wherein the working principle is to use "Moore" law. As shown in FIG. 1, image A and image B have the same or similar corresponding frequency cycle. When the image A and image B are overlapped with each other, as shown in FIG. 2, a new image with a third frequency cycle as a visual effect is generated. As shown in FIG. 3, C represents the micro-texture formed on the surface of the product and D represents the transparent grating lens. By effectively and appropriately offsetting the micro-texture C in FIG. 3 corresponding to the location of the hidden image in FIG. 4, the offset image is obtained as shown in FIG. 5. Through the overlap of the grating lens, the grid size is changed so as to hide the hidden image. As shown in FIG. 6, if the offset is too small, the hidden effect will not be satisfied. If the offset is large enough, the hidden effect will be more satisfactory. However, it will affect the product or the appearance of the printed product, will form surface formation, will affect the aesthetic appearance, and will leave the traces on the product. Therefore, the best approach would be to have a small offset and to use the nanoscale optical lens to detect the hidden image.

Figure 7:
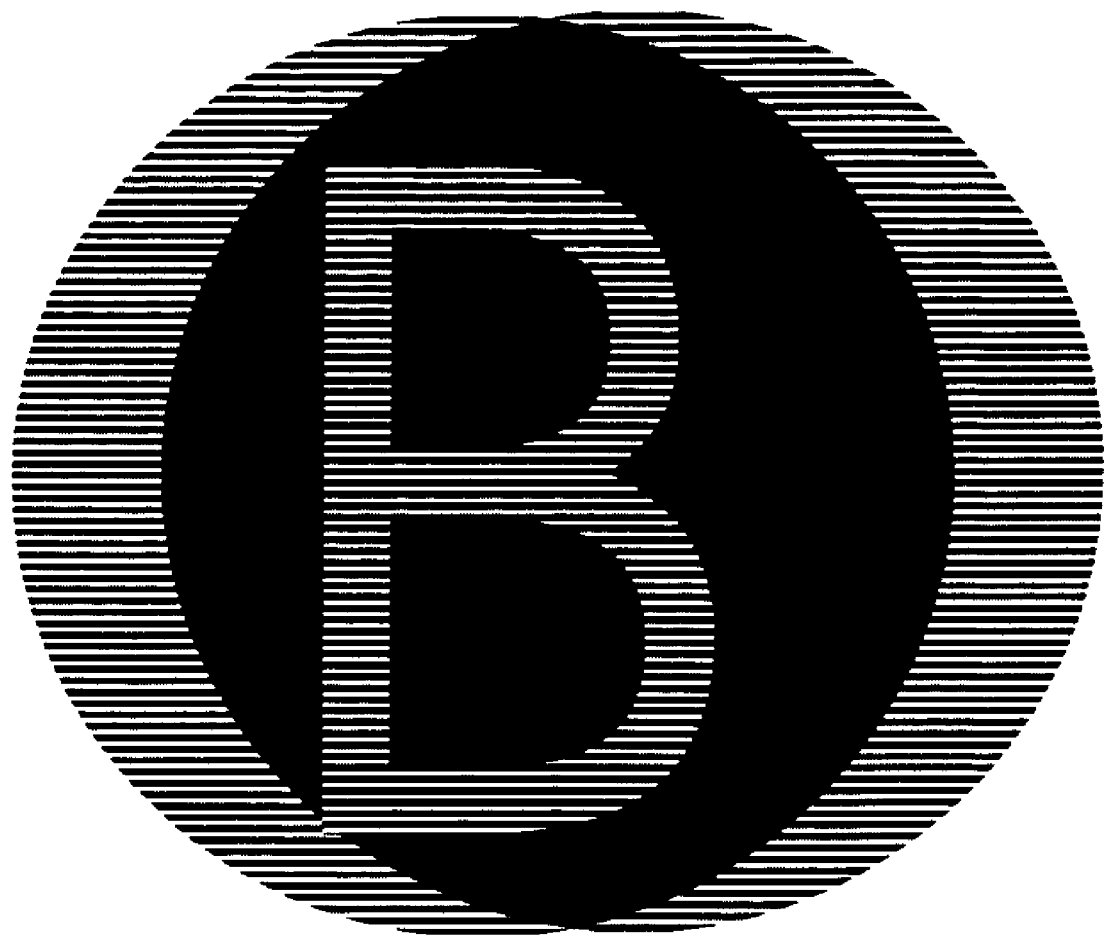
FIG. 7 is a diagram of the present invention illustrating the hidden image C1 shown in FIG. 5 by overlapping with a nano-leveled optics lens having the same frequency cycle.

As shown in FIG. 7, the present invention uses the optical lens and its optical three-dimensional micro-structure to determine the slightly phase shift within accurate detection range. Through the three-dimensional magnification and lens brighten effect, the hidden image in FIG. 5 can be clearly read.

The method to producing the corresponding hidden image for the product comprises the following steps.

(A) Set the array of pixels for the product, wherein the array of pixels has the same level of array-distance corresponding to the micro-structure of the identification device.

(B) Set the content of the hidden image and the position of the array of pixels.

(C) Phase shift dot matrix of the array of pixels in the selected area of the hidden image.

(D) Apply the array of pixels on the product.

The method of producing the hidden image for the identification device comprises the following steps.

(A) Set the micro-structure of the lens that the micro-structure has the same level of array-distance corresponding to the array of pixels of the product.

(B) Phase shift the micro-structure of the lens in responsive to the need of the selected area of the pre-hidden image.

(C) Process the micro-structure on the lens of the identification device.

During the productions of nanoscale optical lens and the hidden image, it must be clear that the material of the product, the manufacturing procedure, the manufacturing technology and the manufacturing equipment so as to choose the best mode to show the effectiveness and security for the implementation of the initial basic setting. The first initial parameter needs to be the best anti-counterfeit and shows the best effect. The following illustrates an example of the present invention.

Figure 8:
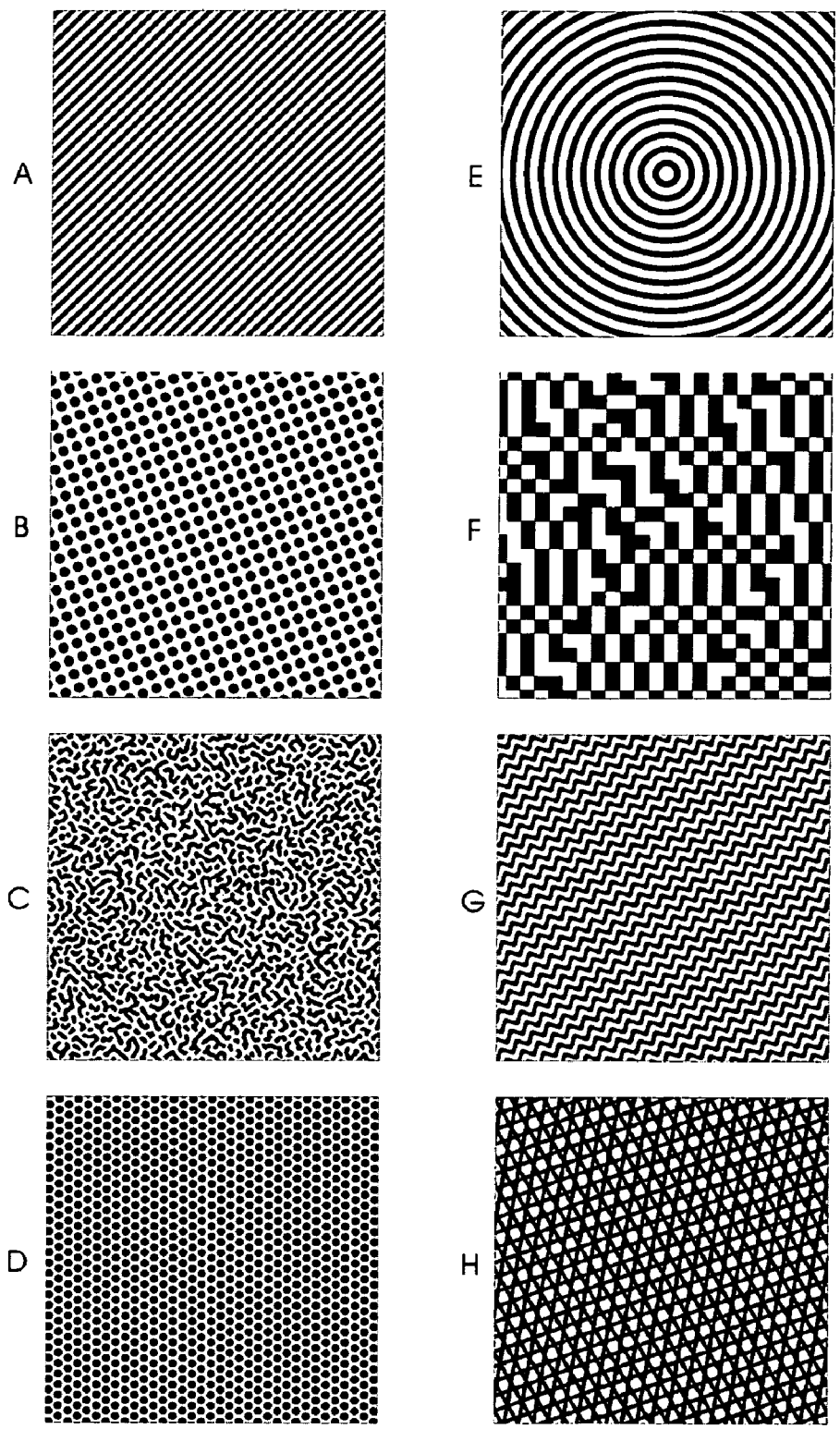
FIG. 8 is an enlarged diagram A-H of the present invention illustrating different array of pixels showed in photo, graphic, density, number of lines, and frequency angle.
Figure 9:
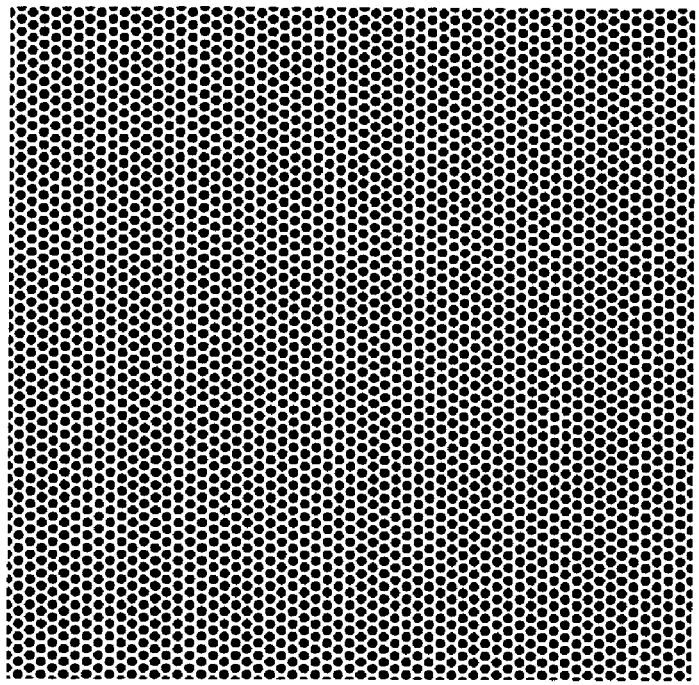
FIG. 9 is a diagram of the present invention illustrating the original graphic texture setting.
Figure 10:
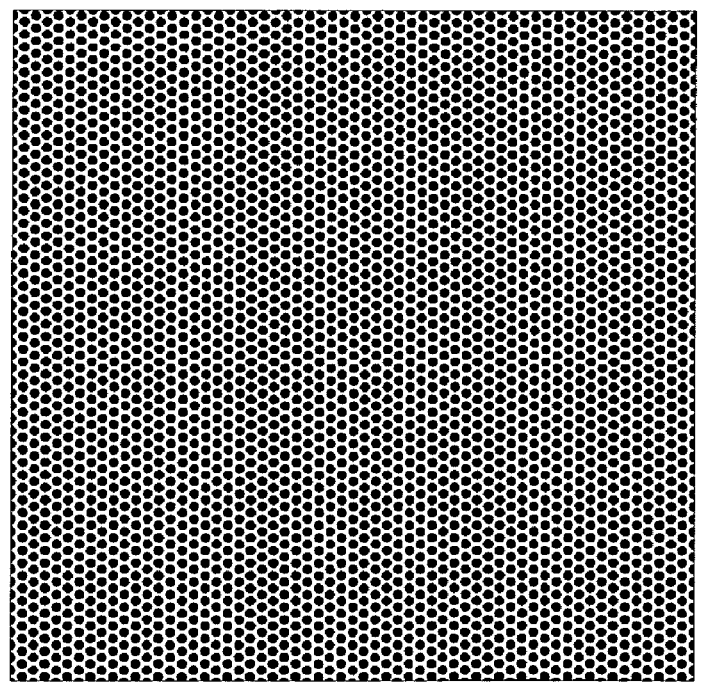
FIG. 10 is a diagram of the present invention illustrating the corresponding graph of the lens.
Figure 11:
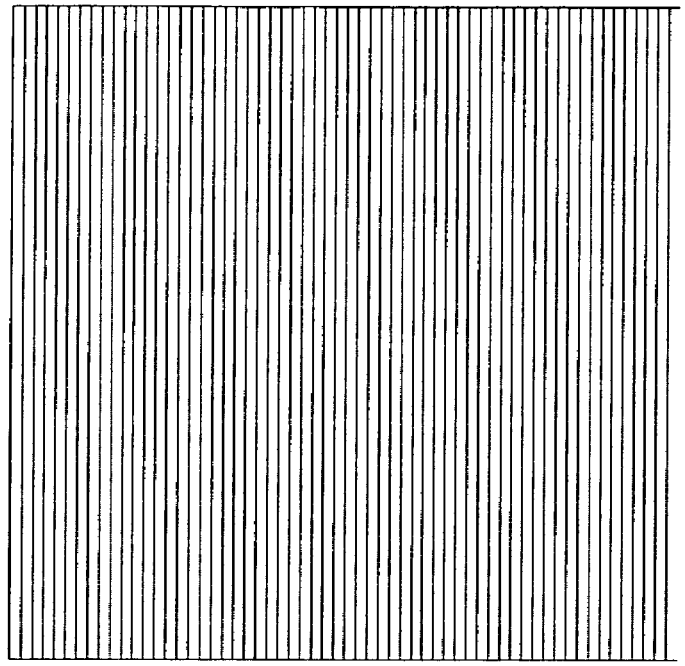
FIG. 11 is a diagram of the present invention illustrating the second corresponding graph of the lens.

(1) Set the initial parameter of array pixels, array pixels, photo, density, numbers, and angles. The image could be straight line, curve line, and various kinds of arrays, and could be arrange by amplitude modulation or the frequency modulation. It could also be symmetry, asymmetry, random, angles or their combination as shown in FIG. 8. As shown in FIG. 9, the standard of the optics lens of the same level is based on the experimental figures and its density as shown in FIG. 10 and FIG. 11.

Accordingly, different densities of the graphics are set to meet the quality of the product, the precision of the production equipment and the requirement of the anti-counterfeiting efforts. The following setting is shown below.

Mold products or products: 250-600 lpi

All kinds of print matters: 175-300 lpi (the amplitude modulation print)

600-2400 lpi (the frequency modulation print)

Electronic video image: 72-300 ppi (dot)

(2) Setting the content and position of the hidden image

Figure 12:
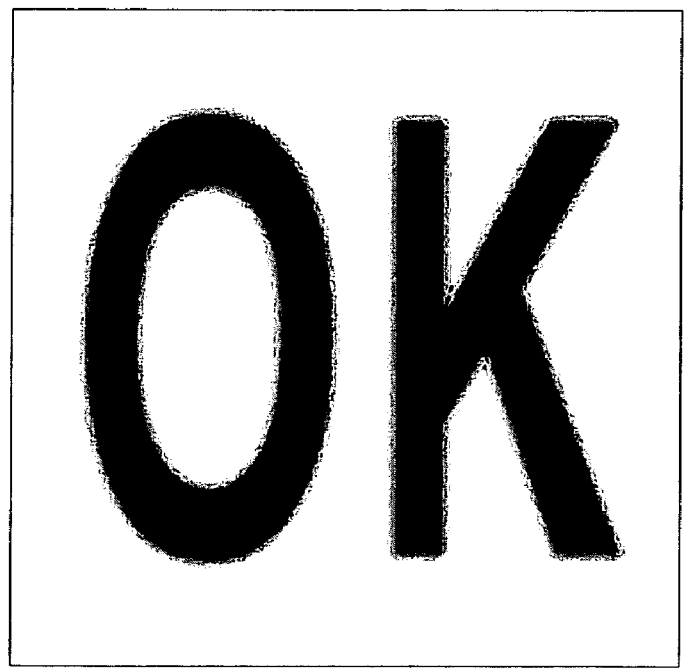
FIG. 12 is a diagram of the present invention illustrating the content of the hidden image and its position.

The hidden image could be black and white, gray scale, colored with two or three dimensional words, graphic, or image. The position could be any location, various positions, or on the surface of the lens. It usually puts on the position having the advantage of that it is easy to read, without any change on its appearance, and it is hard to copy as shown in FIG. 12.

Figure 13:
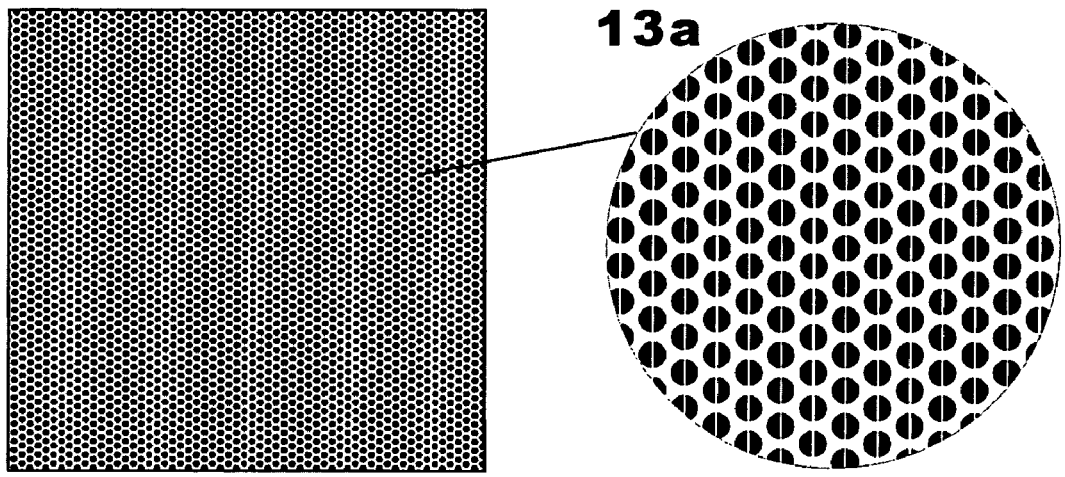

(3) The treatment of phase shift. Through the selected default image frequency as shown in FIG. 13, the corresponding default hidden image as shown in FIG. 12 is set. (the white dotted lines, in the figure, at the grid array showing the original position of the dot matrix, which is equivalent to the main axis position of the micro-structure of the convex lens)

Figure 14:
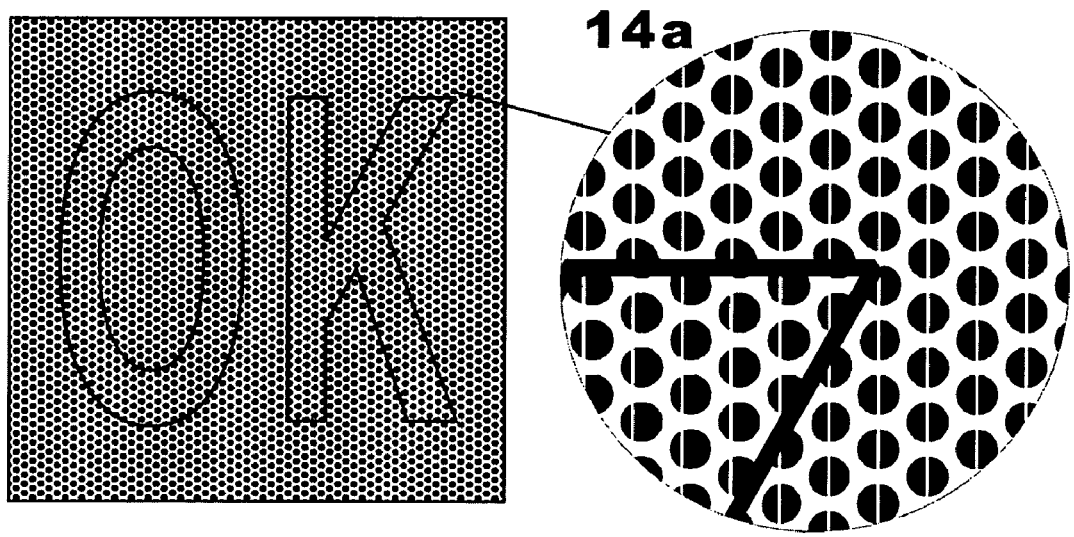
Figure 15:
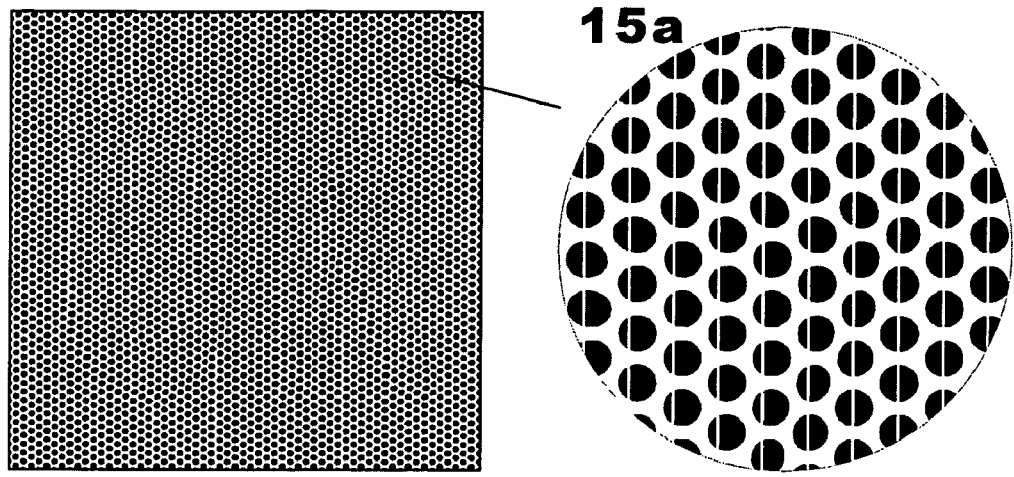
Figure 16:
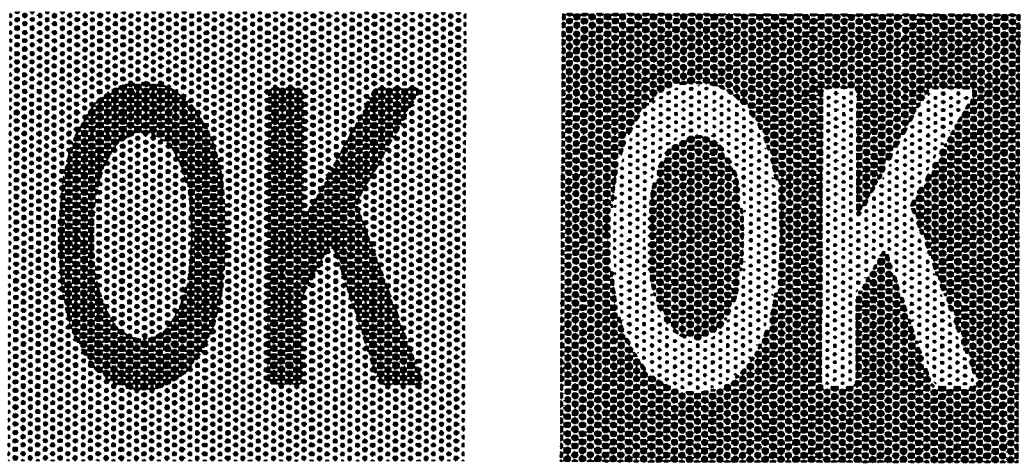
FIG. 16 is a diagram of the present invention illustrating the optical effect of the hidden image by overlapping and moving the nano-optical lens in FIG. 11 with the micro-structure in FIG. 15 to show the depth of view of the hidden image.

As shown in FIG. 14, through the location of the image and the gray scale setting of the image, the range of the phase shift or the change of amplitude can be controlled by the graphics, imaging software, or directly graphical data processing. Accordingly, the higher value of the gray scale of the image is, the higher range of the phase shift is obtained. The maximum of the density spacing is not over D÷2. Finally, the hidden image for the product, mold product, or the lens will be obtained. As shown in FIG. 15, the graphic can be digital image data converted into graphic or image date, wherein the data can be further processed. The phase shift of the image on the printed product can be an image or dot with two dimensional location, size, or the change of gray scale. For the mold product including the lens production, three dimensional data, location, size, or depth of the image can be selectively changed on the processing surface. For the electronic video image, the dot matrix, the grid density of two dimensional location and the gray scale can be changed.

(4) Manufacturing a) Lens manufacturing: The lens can be a plastic injection lens, flow lens, pressured mold lens, corrosion lens, photoengraving lens, laser lens, film coated lens, liquid crystal lens, or film lens. The material of the lens can be plastic, crystal, transparent glass, translucent glass, or translucent with colored glass. The lens can be a single or polymorphous lens structure, wherein the micro-structure of the lens surface of the lens can be a convex lens, concave lens, flat lens, prisms, V-groove lens, grating lens, or the combination thereof. The optics structure could be ball shape, non-ball shape, rod shape, symmetry, asymmetry, irregular shape, or the combination of them. The lens could be singular or polymorphous structure, or the combination thereof. Under special circumstance, other effective light-assisted detection can be used.

It uses modern processing equipment for producing the hidden image on the mold of the lens or for directly producing the hidden image on the lens. The mold can be made of steel, copper, nickel, copper alloy or other metal alloy material. For mechanical field, the hidden image can be formed by the digital ultra-precision process, such as freeform machining technology, single-point diamond turning, three-dimensional non-axisymmetric freeform milling, fast tool servo, etc. . . . For chemical processing, the hidden image is formed by precision photographic process with the appropriate process to complete the slow corrosion. The utilization of such equipment and the production of the requirement of the following specifications will be able to make the hidden image which can be read by the nano scale optical lens.

Figure 17:
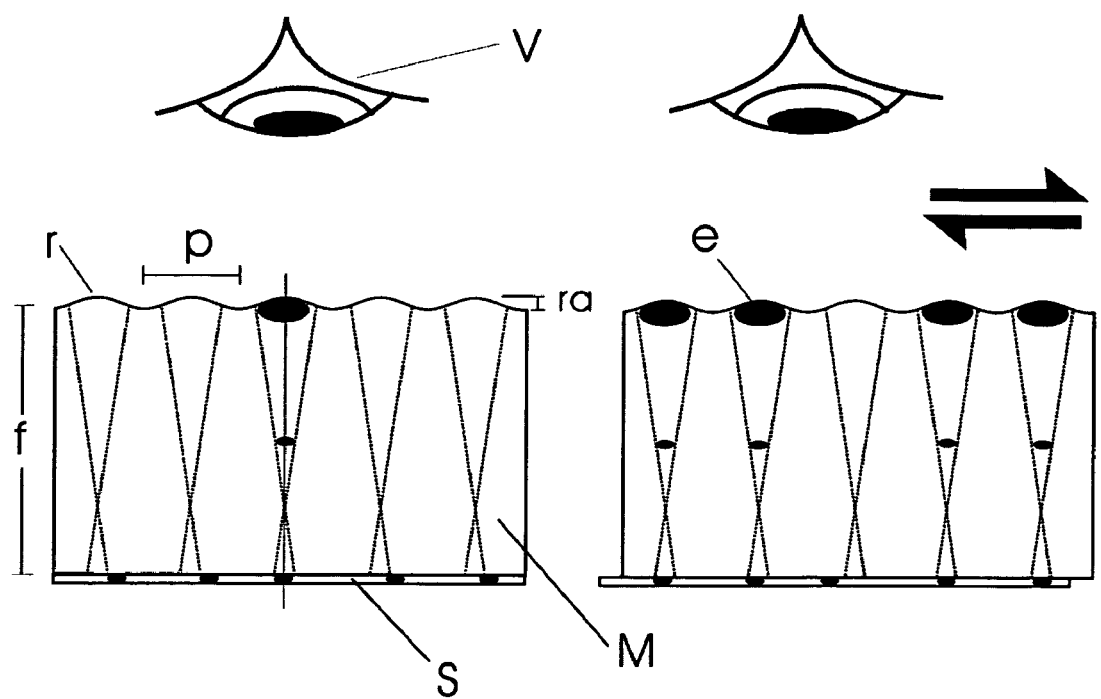
FIG. 17 is a diagram of the present invention illustrating the working principle of the nano-optical lens.

As shown in FIG. 17, the micro-structure of the optics lens is shown. The left and right figures show the shifting effect of the lens on the products, respectively, wherein:

P: density of array pixel of the lens.

r: the radius value of the protruding micro-structure lens.

f: the setting distance between the surface of the convex lens and the surface of the product.

M: lens medium material

Mf: the refract coefficient of the medium of lens.

S: the product surface texture or the dot matrix on the printed product.

e: video effect by observation through the lens ra: the depth of convex lens which is usually less than 0.001 mm.

V: the top view of the lens by observation

Sf: the proportion of the surface of the product to the density of array pixels.

If: the release of the contraction rate of the procedure of making the lens.

The most important value is r, and other parameters can reset. When the micro-structure is a convex lens, the radius value of the micro-structure is:

$$r = f \div (2 \times Mf \times Sf \times If)$$

b) part of the product

The die product can be manufactured directly in the mold surface treatment or surface treatment product. An appropriate texture frequency is selectively set for further processing according to the material properties of the product.

For metal products, CNC machining center, optical grinding machine, and other precision machining equipment can be used, such as film exposure of chemical etching, laser processing, die stamping, color electroplating, etc. . . .

Paper packaging product: it can be embossed mold or directly through dot matrix printing.

Plastic products: most of the plastic products are formed by injection molding or hot pressing. It is also available for metal mold. Plastic product can also be directly made by CNC machining center, laser processing.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An identification device for a hidden image, comprising a lens having a micro-structure with the same level of array-distance in responsive to an array of pixels of a product, wherein selected areas of said array of pixels and said micro-structure of said identification device are entirely or partially phase shifted in a controllable manner, such that when said array of pixels and said micro-structure of said identification device are super positioned or spatially aligned, a hidden image is shown by the phase shift between said array of pixels and said micro-structure of said identification device, wherein said lens is one of single or polymorphous lens structure, wherein said micro-structure of a lens surface of said lens is a convex lens, wherein a radius value of said micro-structure is $r = f - (2 \times Mf \times Sf \times If)$, wherein f is the setting distance between said lens surface of said convex lens and surface of said product, wherein Mf is the refraction coefficient of the medium of said lens, wherein Sf is the proportion of said surface of the product to said density of array pixels, wherein If is the release of the contraction rate of the procedure of making said lens.

* * * * *